ASPIRATOR APPARATUS FOR BAG INFLATION SYSTEMS

Original Filed April 4, 1969 2 Sheets-Sheet 1

RONALD H. DAY
Harvey J. Lewis
ATTORNEY

ASPIRATOR APPARATUS FOR BAG INFLATION SYSTEMS

Original Filed April 4, 1969 2 Sheets-Sheet 2

INVENTOR
RONALD H. DAY
Harvey S. Lawhurst
ATTORNEY

United States Patent Office

Re. 27,860
Reissued Jan. 1, 1974

27,860
ASPIRATOR APPARATUS FOR BAG INFLATION SYSTEMS

Ronald H. Day, Mill Valley, Calif., assignor to Sargent Industries, Inc., Los Angeles, Calif.

Original No. 3,572,974, dated Mar. 30, 1971, Ser. No. 813,660, Apr. 4, 1969, which is a continuation-in-part of Ser. No. 803,178, Feb. 28, 1969. Application for reissue Mar. 13, 1972, Ser. No. 234,149
Int. Cl. F04f *5/48*
U.S. Cl. 417—184 24 Claims

Matter enclosed in heavy brackets [ ] appears in the original patent but forms no part of this reissue specification; matter printed in italics indicates the additions made by reissue.

ABSTRACT OF THE DISCLOSURE

An improved aspirator device for bag inflation systems and the like, which is rotationally symmetric about the axis of the device and includes an annular atmospheric flow path concentric with one or more rings of aspirating jets to provide a high efficiency aspirating function. The aspirator includes a single operation closure component which acts to open the atmospheric flow path upon actuation of the device and close the atmospheric flow path when a predetermined pressure has been built up within the inflated device. Means are provided for allowing a selected inflated device pressure to initiate closure of the atmospheric flow path.

This application is a continuation-in-part of U.S. Pat. application Ser. No. 803,178 filed Feb. 28, 1969 and assigned to the assignee of the present invention.

BACKGROUND OF THE INVENTION

The present invention relates generally to aspirator devices and, more particularly, to a novel aspirator structure for use in compressed gas bag inflation systems.

It is our intent that the entire specification and drawing of the aforementioned copending application be expressly incorporated by reference into this disclosure.

OBJECTS OF THE INVENTION

A principal object of the present invention is to provide a novel aspirator unit which is simple in mechanical structure, has a high aspirating efficiency and includes means for terminating the aspirating function upon sensing a predetermined bag inflation pressure.

Another object of the present invention is to provide an aspirating apparatus for bag inflation systems wherein the flow path of the aspirated gas is unimpeded by flow-directional changes or flapper valves within the aspirating flow path and which include means for terminating entrainment of aspirated gases in response to the attainment of a predetermined bag inflation pressure.

Still another object of the present invention is to provide a highly efficient aspirating device which enables the use of optimum aspirating jet configurations and flow conditions.

SUMMARY OF THE INVENTION

In accordance with the present invention, a novel aspirator structure is provided the atmospheric entrance ports and aspirating chamber of which are rotationally symmetric about the axis of the effluent orifice and includes an annular venturi path which is aligned with a plurality of aspirating jets. The exterior wall of the aspirating chamber is formed by a displaceable cylinder, one end of which serves as a closure means for closing the atmospheric entrance ports. The cylinder is normally biased into a closed position by an appropriate spring means but is actuated into its open position in response to gas pressure applied to the end of an actuating plunger coupled thereto. The spring means causes the cylinder to be returned to its closed position when the gas pressure applied to the top of the actuating plunger is removed by actuation of a bag pressure responsive valving apparatus.

An important advantage of the present invention is that it includes means for closing the atmospheric entrance ports upon attainment of a predetermined bag pressure so that the remaining high-pressure gas may be utilized to inflate the bag to a pressure in excess of atmospheric pressure.

Another advantage of the present invention is that the atmospheric entrance closure apparatus is closed in response to a predetermined bag pressure and is independent of the aspirating gas flow rate or pressure.

Still other advantages of the present invention will become apparent to those skilled in the art after having read the following disclosure of a preferred embodiment which is illustrated in the several figures of the drawing.

IN THE DRAWING

DESCRIPTION OF THE PREFERRED EMBODIMENT

Figure 1:
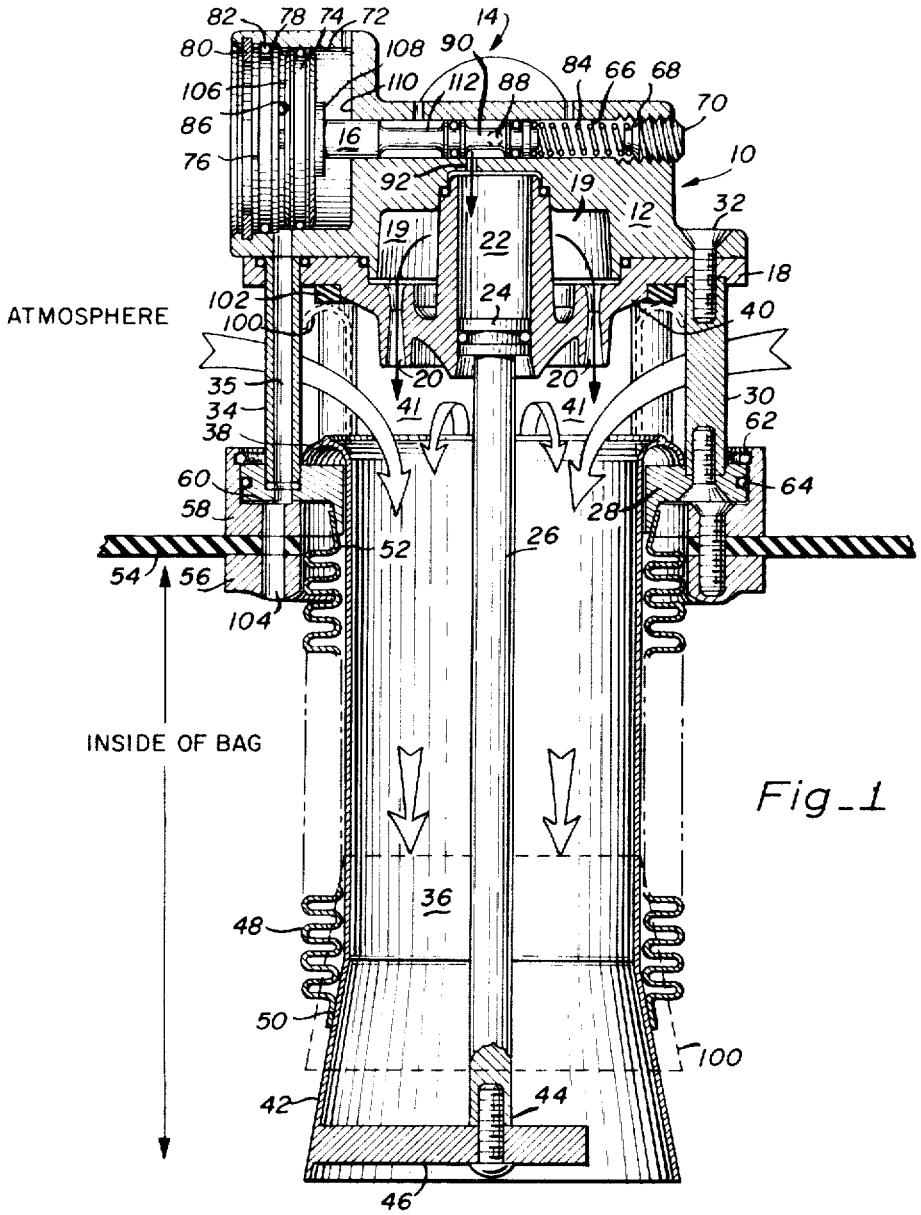
FIG. 1 is an axial cross section taken through an aspirator device in accordance with the present invention.

Referring now to FIG. 1 of the drawing, there is shown an axial cross section of an aspirating structure 10 in accordance with a preferred embodiment of the present invention. This embodiment includes an upper cap member 12 having a high pressure gas inlet 14 (better illustrated in FIG. 3) and a transverse passageway extending therethrough which serves as a housing for the poppet valve 16. The lower side of the cap member 12 is adapted to mate with the high pressure jet supporting flange member 18 and an annular cavity 19 formed therebetween serves as a high-pressure gas conduit from the inlet 14 to the high-pressure jets 20 which are circularly arrayed around the passageway 19. In the center of the member 18, there is a cylindrical passageway 22 extending through the member 18 from the top to the bottom thereof to form a cylinder for receiving the head 24 of a pneumatic actuating member 26.

The cap member 12 and jet supporting flange 18 are mounted to an annular base flange 28 and spaced therefrom by a plurality of cylindrical spacer rods 30. The members 12 and 18 are fastened to the upper ends [32] of the spacer rods 30 by means of suitable fastening means 32 and the base flange 28 is likewise secured to the bottom end of the spacer rods 30. The spacer rod 34, however, is tubular and provides a gas communicating flow path between the interior of the inflated bag and one end of the poppet 16 as will be more specifically described below.

Telescopically received within the central aperture of the flange 28 is a cylindrical barrel member 36, the upper end 38 of which is rolled outwardly so that when in the open position, illustrated in FIG. 1, it serves to cooperate with the lower surface 40 of the flange 18 to produce a venturi passage 41 through which the atmospheric gases may be drawn. The lower end 42 of the barrel member 36 may be suitably flared to provide an aerodynamically suitable exhaust port for the aspirated gases. The lower end of the barrel 36 is attached to the end 44 of the piston 26 by spider members 46 of suitable design so as to provide minimum flow impedance to the aspirated gases. To provide an upwardly biasing force to the barrel member 36, an accordion like spring member 48 is secured at one end 50 to the lower portion of the barrel 36 and at the other end 52 to the base flange 28.

In order to accommodate the mounting of the aspirating device to the inflatable bag 54, an aperture is provided therein which is formed by a pair of annular members 56 and 58 which sandwich the apertured edge of the flexible bag 54 therebetween. An annular seat 60 is provided in the upper ring 58 for receiving the base flange 28 as the barrel and spring assembly of the aspirator 10 is inserted into the opening formed by the rings 56 and 58. The aspirator 10 is securely fastened to the bag 54 and maintained in engagement with the seat 60 by a snapring 62. An annular O-ring 64 insures an airtight seal therebetween.

The cap member 12 has a bore 66 passing transversely therethrough for receiving the valve poppet 16. The end portion 68 thereof is threaded to receive an adjustable end plug 70. At the other end of the bore 66, there is formed an enlarged cylindrical bore 72 for receiving the pressure head 74 of the poppet 16, the operative portion of which extends into the bore 66. A sealing member 76 is positioned within the bore 72 and is secured against the shoulder 78 by a snapring 80. The member 76 includes an annular O-ring 82 which provides an airtight seal at the end of the chamber. The poppet 16 is normally biased leftwardly by a spring means 84 in the position shown, high-pressure gas entering the inlet 14 (see FIG. 3) will flow through the passage 86 into the chamber 19 to be distributed to a plurality of jets 20 positioned in one or more circular arrays around the axis of the flange 18. However, some of the high-pressure gas will enter the passageway 88 and flow around the spool 90, through the passages 92 and into chamber 22.

Figure 3:
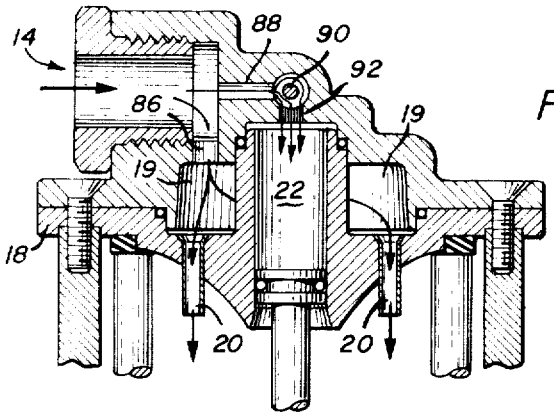
FIG. 3 is a cross section of the upper portion of the aspirator illustrated in FIG. 1 taken along the lines [3—'] *3—3* of FIG. 2.
Figure 2:
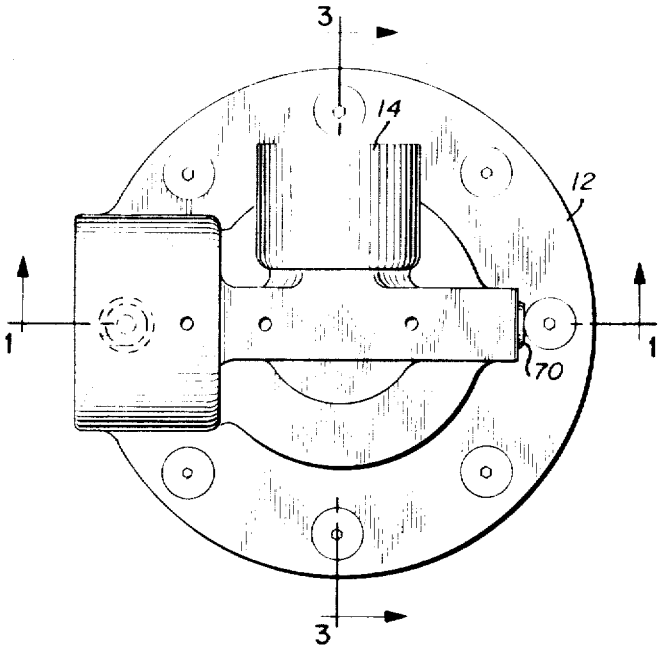
FIG. 2 is a top view of the aspirator illustrated in FIG. 1.

It will be noted that whereas in the FIG. 1, embodiment, the flange 18 and jets 20 are integrally formed into a single member, the FIG. 3 embodiment shows the alternative use of individual inserts passed through apertures in the flange 18 to form the jets 20. This obviously enables the dimensions of the inserts 20 to be chosen to fit a particular application.

When the aspirator 10 is installed in the deflated bag 54, the barrel 36 is retracted into the position shown by the dotted lines 100 and the rolled edge 38 of the barrel 36 sealingly engages the annular sealing ring 102 which is mounted to the lower surface of the flange 18. Prior to actuation the barrel 36 is maintained in this closed position by the spring means 48 so as to prevent the entry of moisture or foreign matter into the bag 54. The poppet 16 is biased leftwardly into the position shown in FIG. 1 by the spring means 84 with a force which is determined by the position of the threaded plug 70, i.e., the bag pressure required to drive the poppet 16 rightwardly is selectable by varying the position of the plug 70.

Upon triggering the regulator means of the inflation system including the aspirator 10 (one such system is illustrated in the aforementioned copending application), high-pressure gas from the storage container is caused to flow into the inlet 14 and thence to the chamber 19 to be distributed to the jets 20 to produce a plurality of high-pressure jet streams within the cylinder 36. At the same time the high-pressure gas flows through the passage 88, around the spool 90 and through the passages 92 into the chamber 22 to apply a force to the piston head 24. This causes the member 26 to be driven downwardly against the force of the spring means 48 causing the cylinder 36 to be displaced into the aspirating position shown in FIG. 1.

With the cylinder 36 in this position, atmospheric gases are entrained within the venturi passage 41 formed by the cylinder 36 and the lower side 40 of the flange 18. The high-pressure gases escaping through the jets 20, which are radially spaced in one or more concentric rows about the axis of the device, cause a low-pressure condition to be produced within the throat of the aspirating device which, as a result, causes large quantities of atmospheric air to be drawn in through the aspirator openings to be entrained by the jet streams and forced into the inflatable device through the lower end of the barrel 36.

Figure 4:
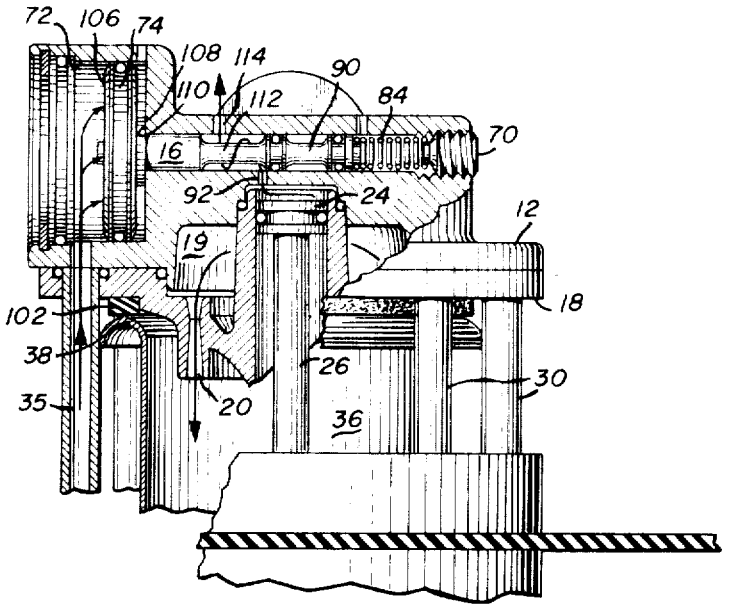
FIG. 4 is a partial cross section of the upper portion of the aspirator shown in FIG. 1 taken along the lines 1—1 *of FIG. 2* illustrating operation of the bag pressure responsive valve means.

The aspirating action will continue until the pressure in the bag 54 builds up to a predetermined pressure level at which time the barrel 36 is caused to return to its upper position to seal off the atmospheric flow passage. This predetermined pressure level is determined by the position of the threaded plug 70 which by acting on spring 84 causes a selected biasing force to be applied to the end of the poppet 16. As the pressure in the bag 54 builds up, this pressure is communicated through the passages 104 and 35 to the face 106 of the piston 74. When the pressure within the bag 54 has built up to a level capable of overcoming the spring force of spring 84, the poppet 16 will be driven rightwardly until the stop 108 abuts the end wall 110 of the bore 72, as is more clearly shown in FIG. 4.

With the poppet 16 in this position the spool portion 112 provides a flow passage to atmosphere from the chamber 22 through opening 92, around the spool 112, and out through the atmospheric opening 114. With the pressure thus eliminated from the top of the piston head 24, the spring 48 causes the barrel 36 to be again retracted into its upward position so that the lip 38 engages the sealing member 102 blocking the entrance of further atmospheric air as well as the exit of any gases from the bag 54. The remaining gas within the storage container will then be dumped directly into the bag 54 to cause the bag 54 to be inflated to a pressure somewhat above atmospheric pressure.

Although not shown in this embodiment of the invention, it is contemplated that the poppet valve 16 could also be adapted to shut off the high-pressure gas flow to the jets 20 upon sensing a second predetermined pressure level, or, a second poppet valve structure could be provided for this purpose.

Whereas, in prior art structures the throat-to-jet area ratio required to build up the desired working pressure in the bag 54 was approximately 40–60 to 1, the present invention allows the throat-to-jet area ratio to be increased to 80–120 to 1, or higher, and is thus much more efficient. Other advantages of this particular structure over those of the prior art should likewise be apparent to those of skill in the art. For example, the inlet area of the present invention for receiving atmospheric gases is substantially larger than that possible in prior art structures, thus allowing larger quantities of atmospheric gases to be drawn into the device per unit time. In addition, because of the rotationally symmetric nature of the aspirating chamber, this structure enables the use of a considerably higher number of high-pressure jets than is possible with other structures known in the prior art thus enabling a greater speed of aspiration.

Still further, it is of material importance that the axes of the high-pressure jet stream substantially coincide with the atmospheric flow stream and the two are exhausted directly into the inflatable device 54 with neither a change in flow direction, nor the presence of a material flow disturbing structure downstream of the aspirating region. This feature alone provides a substantial increase in the aspirating efficiency of the apparatus over any known prior art device. Moreover, the improved pressure-sensing feature of this particular embodiment enables the most favorable aspirating ratio and high-pressure gas conditions to be utilized since the atmospheric entrance closure member, once opened, is not dependent upon the dieoff of the high-pressure gases as a means by which to cause the atmospheric inlet to be closed. The closure is automatically facilitated upon the attainment of a predetermined bag pressure and is completely independent of the pressure remaining in the high-pressure gas source.

While only a single preferred embodiment of the improved aspirator of the present invention has been set forth in detail hereinabove, it is contemplated that after having read the above disclosure certain other modifications will be apparent to those skilled in the art. It is therefore to be understood that the above disclosure is to be taken as merely illustrative of a preferred embodiment and not as limiting the invention to the particular structure illustrated. Furthermore, it is intended that the appended claims be interpreted as covering all such modifications which fall within the true spirit and scope of the invention.

I claim:

1. An aspirating device of the type disclosed comprising:

means forming a generally cylindrical body member which is intended to be mounted substantially external of an inflatable device, said body member having external openings passing through the sides thereof for admitting atmospheric air into said body member;

flow diverting means disposed axially concentric with said body member and forming the inner wall of an annular flow path for atmospheric gases entering said external openings, said annular flow path being generally concentric with said body member;

high-pressure jet means passing through said flow diverting means for directing a plurality of streams of high-pressure gas into said annular flow path in a direction generally parallel to the axis of said body member;

closure means normally closing said external openings, said closure means being opened by closure opening means outside of said atmospheric flow path and in response to the application of said high-pressure gas flow to the aspirating device; and valve means responsive to the pressure produced in said inflatable device for interrupting the high-pressure gas flow to said closure opening means so as to cause said closure means to return to its normally closed position.

2. An aspirating device as recited in claim 1 wherein said closure opening means is a pneumatic means responsive to said high-pressure gas flow and is formed in said flow directing means outside of said annular flow path, said pneumatic means opening said closure means in response to the application of said high-pressure gas to said aspirating device.

3. An aspirating device as recited in claim 2 wherein said valve means includes a displaceable spool member which upon being displaced to a predetermined position causes said high-pressure gas flow to said pneumatic means to be interrupted disabling said pneumatic means.

4. An aspirating device as recited in claim 3 wherein said spool means is attached to a piston means having a force applying surface which is subjected to the fluid pressure within said inflatable device, said pressure being communicated through a fluid conduit which is provided between said force applying surface and said inflatable device.

5. An aspirating device as recited in claim 1 wherein said closure means is an open cylinder one end of which has an outwardly turned flange, the flanged end of said cylinder being telescopically received within said body member and forming the outer wall of said annular flow path, said flanged end being adapted to sealingly engage the lower side of said flow diverting means when displaced to one extreme closing said annular flow path, said flanged end providing a venturi action within said flow path when axially displaced from said sealing engagement.

6. An aspirating device as recited in claim 5 wherein spring means are provided for maintaining said closure means in its closed position when said aspirating device is not subjected to a high-pressure flow of gas and for causing said closure to be returned to its closed position in response to the actuation of said valve means.

7. An aspirating device as recited in claim 6 wherein said closure opening means is a pneumatic means responsive to said high-pressure gas flow and is formed in said flow directing means outside of said annular flow path, said pneumatic means opening said closure means in response to the application of said high-pressure gas to said aspirating device.

8. An aspirating device as recited in claim 7 wherein said valve means includes a displaceable spool member which upon being displaced to a predetermined position causes said high-pressure gas flow to said pneumatic means to be interrupted disabling said pneumatic means.

9. An aspirating device as recited in claim 8 wherein said spool means is attached to a piston means having a receiving surface which is subjected to the fluid pressure within said inflatable device, said pressure being communicated through a fluid conduit which is provided between said force applying surface and said inflatable device.

10. In an inflation system for inflating an inflatable device including a source of compressed gas, means for regulating the flow of compressed gas caused to flow into said inflatable device, and an aspirating means for increasing the quantity of gas forced into said inflatable device beyond that contained within said source of compressed gas, an improved aspirator means comprising:

a generally cylindrical housing means mounted substantially external of said inflatable device and having openings in the sides thereof for communicating atmospheric air into said housing means;

flowing-directing means disposed within said housing means and defining a generally cylindrically shaped flow path between said openings and said inflatable device;

jet means for introducing into said flow path in a direction generally parallel with the axis of said housing means a plurality of streams of said compressed gas;

closure means for closing said openings; and pneumatic means for opening said closure means when said aspirator device is subjected to said compressed gas and causing said closure means to be closed when the pressure in said inflatable device reaches a predetermined level, said pneumatic means including a piston means coupled to said closure means for opening said closure means when said pneumatic means is subjected to said compressed gas and a valve means responsive to the pressure in said inflatable device for interrupting the flow of compressed gas to said pneumatic means when the pressure in said inflatable device reaches said predetermined level.

11. In an inflation system as recited in claim 10 wherein said valve means includes a displaceable spool member which upon being displaced to a predetermined position causes the flow of said compressed gas to said piston means to be interrupted to disable said piston means.

12. In an inflation system as recited in claim 11 wherein said closure means is an open cylinder one end of which is telescopically received within said housing means and adapted to sealingly engage said flow directing means in one position to close said atmospheric openings and to form a venturi restriction in said flow path when in another position.

13. In an inflation system as recited in claim 12 wherein resilient biasing means are provided for biasing said closure means into its closed position when the flow of compressed gas to said aspirator means is interrupted in response to the actuation of said valve means by said predetermined level of pressure in said inflatable device.

*14. In combination,*

*a housing having an inlet section and at least one passage in the inlet section for the flow of atmospheric air,*

*barrel means movable between first and second positions, the barrel means being disposed in the first*

*position in sealing relationship with the inlet section and being disposed in the second position in displaced relationship to the inlet section to provide for the passage of fluid through the atmospheric opening in the inlet section,*

*means for providing a fluid under pressure,*

*control means supported on the barrel means and operatively coupled at opposite ends to the barrel means and the housing for biasing the barrel means to the first position,*

*support means disposed within the housing for providing for the passage of the fluid from the fluid means through the housing and the barrel means and for the creation of a venturi effect in the passage in the housing to produce a flow of atmospheric air through the passage and the barrel means, and*

*means operatively coupled to the barrel means for triggering the barrel means from the first operative relationship to the second operative relationship.*

*15. The combination set forth in claim 14 wherein jets extend through the support means to pass the fluid from the fluid means into the housing.*

*16. In combination,*

*means for providing fluid under pressure,*

*inflatable means for receiving the fluid from the fluid means,*

*a housing having a passage for the introduction of atmospheric air into the housing,*

*barrel means movable between first and second positions and disposed relative to the housing in the first position to close the passage and disposed relative to the housing in the second position to open the passage for the introduction of atmospheric air into the housing,*

*means disposed relative to the housing and the barrel means for biasing the barrel means to the first position,*

*trigger means operatively coupled to the bias means and actuatable to overcome the bias means and obtain a movement of the barrel means to the second position,*

*means disposed within the housing and responsive to the actuation of the trigger means for introducing jets of fluid into the housing and the barrel means to produce a venturi effect for drawing atmospheric air through the passage and into the barrel means, and*

*means for providing a feedback path between the inflatable means and the fluid means and responsive to a particular pressure of the fluid in the inflatable means for interrupting the introduction of fluid from the fluid means into the barrel means.*

*17. The combination set forth in claim 16 wherein jets extend through the jet means to pass the fluid under pressure from the fluid means for creating the venturi effect.*

*18. The combination set forth in claim 16 wherein the barrel means is provided with a rolled edge and the housing is provided with sealing means to facilitate the production of a seal between the barrel means and the housing in the first position of the barrel means.*

*19. The combination set forth in claim 16 wherein the bias means is disposed externally of the barrel means and is supported on the barrel means and is coupled at opposite ends to the barrel means and the housing and is biased to retain the barrel means in the first position.*

*20. The combination set forth in claim 15 wherein means are disposed to become inflated by the flow of the atmospheric air and the fluid under pressure through the passage and means are operatively coupled between the inlet section of the housing and the inflatable means and are responsive to the pressure of the fluid in the inflatable means for interrupting the introduction of the fluid in the fluid means to the housing and the inflatable means upon the occurrence of a particular pressure in the inflatable means.*

*21. In combination,*

*a housing having a passage for the introduction of atmospheric air,*

*barrel means movable between first and second positions and disposed relative to the housing in the first position to seal the passage and disposed relative to the housing in the second position to open the passage for the introduction of atmospheric air,*

*means for providing fluid under pressure,*

*trigger means operative to obtain a movement of the barrel means from the first position to the second position,*

*mixing means disposed within the housing and responsive to the movement of the barrel means to the second position for providing for a passage of the fluid from the fluid means through the housing and the barrel means and a mixing of this fluid with atmospheric air passing through the passage and into the barrel means, and*

*biasing means disposed on the barrel means externally of the barrel means and supported at opposite ends on the barrel means and the housing for biasing the barrel means to the first position.*

*22. The combination set forth in claim 21 wherein the mixing means include jets to produce a venturi action for drawing atmospheric air through the passage in the housing for mixture with the fluid from the fluid means.*

*23. The combination set forth in claim 21 wherein the trigger means are operative to overcome the bias provided by the biasing means for obtaining a movement of the barrel means to the second position.*

*24. The combination set forth in claim 21 wherein means are disposed to become inflated by the flow of fluid under pressure and atmospheric pressure through the barrel means and means are provided between the inflatable means and the inlet section of the housing for feeding fluid in the inflatable means back to the inlet section of the housing to interrupt the introduction of fluid under pressure through the housing and the barrel means when the pressure of the fluid in the inflatable means reaches a particular value.*

References Cited

The following references, cited by the Examiner, are of record in the patented file of this patent or the original patent.

UNITED STATES PATENTS

| | | | |
|---|---|---|---|
| 2,975,958 | 3/1961 | Kane | 230—95 |
| 3,204,862 | 9/1965 | Hadler | 230—95 |
| 3,042,290 | 7/1962 | Fraebel | 417—184 |
| 3,338,266 | 8/1967 | Zilka et al. | 417—189 |
| 3,460,746 | 8/1969 | Green et al. | 417—179 |

CARLTON R. CROYLE, Primary Examiner.

R. E. GLUCK, Assistant Examiner.

U.S. Cl. X.R.

417—188, 189, 191